United States Patent [19]

Murabayashi et al.

[11] Patent Number: 4,912,573

[45] Date of Patent: Mar. 27, 1990

[54] DIGITAL DATA REPRODUCING APPARATUS HAVING RECORDING MODULATION MODE DETECTION

[75] Inventors: Noboru Murabayashi, Tokyo; Keiji Kanota, Kanagawa, both of Japan

[73] Assignee: Sony Corp., Tokyo, Japan

[21] Appl. No.: 248,372

[22] Filed: Sep. 23, 1988

[30] Foreign Application Priority Data

Sep. 30, 1987 [JP] Japan .................................. 62-246916

[51] Int. Cl.$^4$ .............................................. G11B 5/09
[52] U.S. Cl. ........................................ 360/51; 360/40
[58] Field of Search ....................... 360/51, 40, 27, 28

[56] References Cited

U.S. PATENT DOCUMENTS

| | | | |
|---|---|---|---|
| 4,151,565 | 4/1979 | Mazzola | 360/40 |
| 4,363,040 | 12/1982 | Inose | 360/51 |
| 4,365,210 | 12/1982 | Harrington et al. | 360/51 |
| 4,389,681 | 6/1983 | Tanoka et al. | 360/28 |

*Primary Examiner*—Vincent P. Canney
*Attorney, Agent, or Firm*—Alvin Sinderbrand

[57] ABSTRACT

In a digital data reproducing apparatus for demodulating digital data recorded on a magnetic medium with either a first or second record modulation mode, such mode is detected by identifying the frequency of a recovered clock signal derived from the digital data by a clock recovery circuit, and an appropriate demodulation circuit for the recording mode is then selected to demodulate the reproduced digital data.

3 Claims, 5 Drawing Sheets

DIGITAL DATA REPRODUCING APPARATUS HAVING RECORDING MODULATION MODE DETECTION

BACKGROUND OF THE INVENTION

1. Field of the Invention

The present invention relates to a digital data reproducing apparatus suitable for use in reproducing digital data recorded on a magnetic tape according to, for example, a Bi-phase Mark modulation or an 8-10 block code modulation.

2. Description of the Prior Art

It has been the practice, in a video tape recorder (VTR) of an 8-mm video system, for example, to PCM encode an audio signal and time compress the encoded signal. The resultant signal is then modulated according to a Bi-phase Mark modulation to produce an audio signal for recording along an audio track formed in connection with a video track, for example, as in U.S. Pat. No. 4,551,771.

The Bi-phase Mark modulation is a modulating method for digital data to be recorded on a magnetic tape, in which carrier signals $S_1$ and $S_2$ of frequencies $f_1$ (=2.9 MHz) and $f_2$ (5.8 MHz), for example, as shown in FIG. 1(A), are provided with a phase relationship such that their zero-cross points coincide with each other. For example, the carrier signal $S_1$ of the lower frequency $f_1$ is recorded on a magnetic tape when, for example, a PCM audio signal is logical "L", while the carrier signal $S_2$ of the higher frequency $F_2$ is recorded when the PCM audio signal is logical "H".

When an audio signal recorded along an audio track is to be reproduced, zero-cross points of the picked up carrier signal $S_1$ or $S_2$ are detected as shown in FIG. 1(B), and then, pulse outputs $PLL_0$ are generated at a sampling pulse oscillator constituted by, for example, a PLL (phase locked loop), such pulse outputs $PLL_0$ having a 45° phase angle with respect to the carrier signal $S_1$ of the lower frequency $f_1$, and having a 90° phase angle with respect to the carrier signal $S_2$ of the higher frequency $f_2$.

Among the pulse outputs $PLL_0$, those appearing with phase angles of 45°, 135°, 225°, 315° of the carrier signal $S_1$ are used as sampling pulses $P_S$ (FIG. 1(C). If positive values are obtained at every two sampling pulses, the reproduced data is determined to be of a logical "L".

The pulse outputs $PLL_0$, with phase angles of 90°, 270° in respect to the carrier signal $S_2$ are used as sampling pulses $P_S$ (FIG. 1(C). If a positive value is obtained at alternate ones of these samplings, the reproduced data is determined to be of a logical "H".

A prior art digital data reproducing apparatus 1 for reproducing the audio data recorded along the audio track in the Bi-phase Mark modulation is arranged, as shown in FIG. 2, so that a recovered clock signal $CK_1$ is extracted from a reproduced carrier signal $S_{PB}$ picked up by a magnetic head 2 from a magnetic tape 3, the signal $CK_1$ having a repetition frequency included in the signal $S_{PB}$, and the reproduced carrier signal $S_{PB}$ ($DT_{PB1}$) is demodulated on the basis of the recovered clock signal $CK_1$.

More specifically, the reproduced carrier signal $S_{PB}$ obtained at the time when the magnetic head 2 scans the video track on magnetic tape 3 is supplied through conventional circuits, for example, a switching circuit (not shown) to a specific video signal processing circuit (not shown), and, and on the other hand, the reproduced carrier signal $S_{PB}$ obtained at the time when the magnetic head 2 scans the audio track on a magnetic tape 3 is supplied through a reproducing amplifier 4 to an equalizer circuit 5, at which a specific equalizing process is performed, and the equalized signal is supplied to the inverting input terminal of a comparator 6 constituted by an operational amplifier circuit.

The noninverting input terminal of the comparator 6 is connected to a power source 6A providing a predetermined reference voltage $V_{REF}$, and thus, the comparator 6 compares the reproduced carrier signal $S_{PB}$ with the reference voltage $V_{REF}$ and supplies the reproduced digital signal $DT_{PB}$ obtained as the result of the comparison to an input terminal D of a synchronizing circuit 7 in the form of a D-type flip-flop structure. The reproduced digital signal $DT_{PB}$ is also supplied to a clock recovery circuit 8 including a phase-locked loop (PLL) circuit.

The clock recovery circuit 8 functions to compare the phase of a reference signal with a predetermined frequency obtained from a voltage-controlled oscillator (VCO) incorporated therein with the phase of the clock component having a predetermined repetition frequency included in the input reproduced digital signal $DT_{PB}$ and thereby obtains the recovered clock signal $CK_1$ precisely phase-locked to the clock component. The recovered clock signal $CK_1$ is supplied to the clock input terminal C of the synchronizing circuit 7 and also to a demodulating process circuit 9.

In this way, the synchronizing circuit 7 synchronizes the reproduced digital signal $DT_{PB}$ with the recovered clock signal $CK_1$ and delivers the synchronized digital signal $DT_{PB1}$ to the subsequent demodulating process circuit 9. Therefore, the demodulating process circuit 9 demodulates the incoming reproduced digital signal $DT_{PB1}$ on the basis of the recovered clock signal $CK_1$.

Recently a system has been proposed for recording audio signals in an 8-mm VTR other than with the above described Bi-phase Mark modulation (hereinafter referred to as the "first record modulation mode"). Such system will be used, for example, in a rotary head digital audio tape recorder (R-DAT). According to this system, as disclosed in U.S. Pat. Nos. 4,617,552 and 4,577,180, when PCM encoding an audio signal, the audio signal is encoded in a much higher recording density than that in the first record modulation mode and the coded signal is then modulated by 8-10 block code modulation (hereinafter to be referred to as a "second record modulation mode" prior to being recorded along the audio track.

In practice, however, the frequency band widths of the recorded signals are quite different for the first and second record modulation modes. Further, the frequencies of the sampling clock are greatly different. For example, the sampling clock frequency in the first record modulation mode is 11.6 MHz while that in the second record modulation mode is 14.8 MHz. Thus, the Nyquist conditions in the electromagnetic conversion systems and the noise spectrum distributions are substantially different for the first and second record modulation modes.

For these reasons, in order for the data recorded in the first or the second record modulation mode to be reproduced from a magnetic tape, it is preferred that the digital reproducing apparatus be provided with first and second equalizer circuits having equalizing characteristics adapted for the respective record modulation modes. Further, first and second demodulating process circuits adapted for their respective record modulation modes, are provided, and the mode of the record modulation used for making the record on the magnetic tape 3 is detected in some way or other, whereupon, the first or the second equalizer circuit and the first or the second demodulating process circuit are selectively used according to the result of the aforesaid detection.

SUMMARY OF THE INVENTION

An object of the present invention is a provision of the digital data reproducing apparatus which is simple in structure and yet capable of identifying the record modulation mode used for recording on a magnetic recording medium.

In accordance with an aspect of the present invention, in an apparatus adapted for reproducing digital data recorded on a magnetic tape according to either a first or a second record modulation mode with different recording density, and in which the recorded digital data is picked up by a magnetic head, a recovered clock signal is obtained from the clock component included in the head output by means of a clock recovery circuit in the form of a phase-locked loop circuit, and the picked up head output is demodulated based on the recovered clock signal whereby the digital data is obtained; detecting means are provided for identifying the frequency of the recovered clock signal thereby determining whether the record modulation mode used for recording on the magnetic tape being reproduced is the first or second record modulation.

Since the frequencies are different for the first and the second record modulation modes, by having the frequency of the recovered clock signal identified by the detecting means it can be readily determined whether the record modulation mode used for making the record on the magnetic recording medium is the first mode or the second mode.

DETAILED DESCRIPTION OF THE PREFERRED EMBODIMENTS

Figure 1:
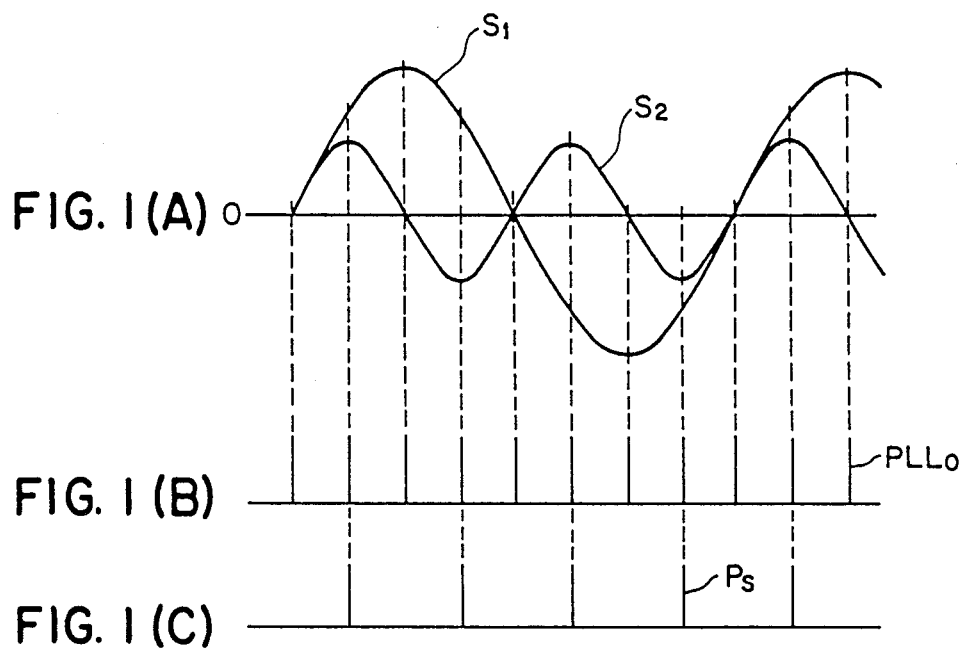
FIGS. 1(A), 1(B), and 1(C) are waveform charts to which reference is made in explaining operation in the Bi-phase Mark modulation method.
Figure 2:
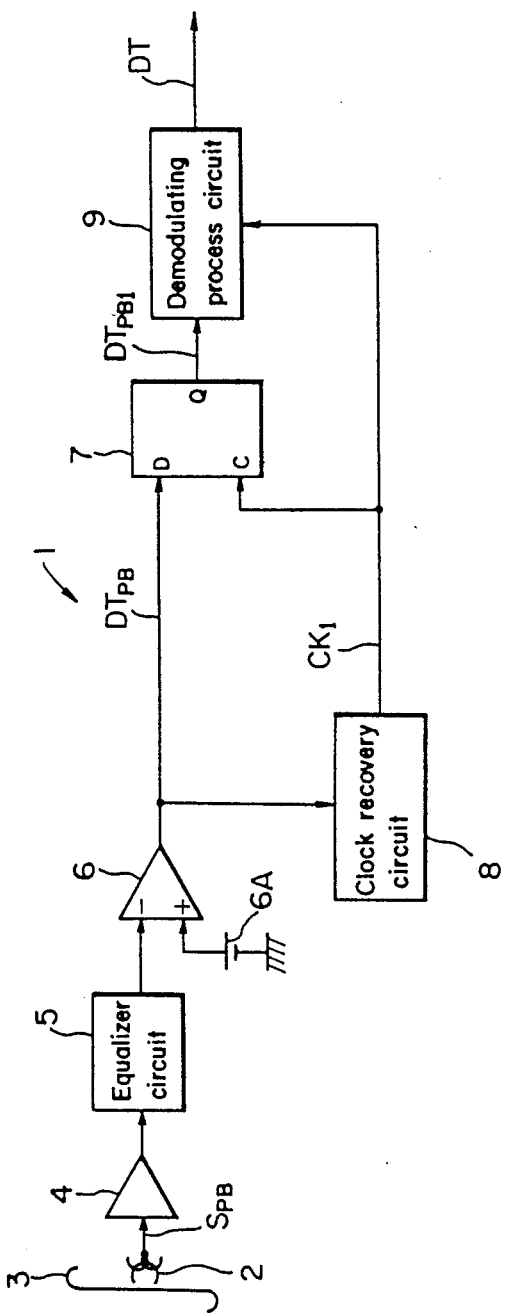
FIG. 2 is a block diagram showing a prior art digital data reproducing apparatus.

A digital data reproducing apparatus 10 according to a first embodiment of the present invention will now be described with reference to FIG. 3, wherein parts corresponding to those described with reference to FIG. 2 are denoted by the same reference numerals, and in which a picked up output $S_{PB}$ obtained from a magnetic head 2 is supplied through a reproducing amplifier 4 to an input terminal of a first switching circuit 11.

The first switching circuit 11 is, for example, in the form of an analogue switch structure, and changes over the incoming picked up output $S_{PB}$, based on a control signal $S_{CNT1}$ supplied by a control circuit 17, either to a first equalizer circuit 5A having an equalizing characteristic adapted for the first record modulation mode or to a second equalizer circuit 5B having an equalizing characteristic adapted for the second record modulation mode. The outputs of the equalizer circuits 5A and 5B are supplied to the inverting input of a subsequent comparator 6.

In addition to the above, the reproduced digital signal $DT_{PB1}$ obtained from a synchronizing circuit 7 is supplied to a second switching circuit 12. The second switching circuit 12 is, for example, in the form of an analogue switch structure and is also controlled by the control signal $S_{CNT1}$ supplied by the control circuit 17, so as to pass the reproduced digital signal $DT_{PB1}$ either to a first demodulating process circuit 9A for performing a demodulating process adapted for the first record modulation mode or to a second demodulating process circuit 9B for performing a demodulating process adapted for the second record modulation mode.

A recovered clock signal $CK_1$ obtained from the clock recovery circuit 8 is input to the clock terminal C of the synchronizing circuit 7; the first and the second demodulating process circuits 9A and 9B, and a 1/10 frequency divider 13 in which the frequency of the clock signal is divided by 10 and the resulting frequency divided signal $S_{CK}$ is then supplied to a frequency comparison circuit 14 including a multiplier and a low-pass filter (not shown).

The frequency comparison circuit 14 is further supplied with a reference frequency signal $f_{REF}$ from a reference signal oscillator circuit 16 having a quartz crystal 15. Thus, the frequency comparison circuit 14 compares the signal $S_{CK}$ having a frequency which is 1/10th the frequency of the recovered clock signal $CK_1$ with the reference frequency signal $f_{REF}$ and, when the frequencies of these signals are not in agreement, delivers a compared output $S_{CP1}$ including a beat component to the control circuit 17.

In the case of the present embodiment, the quartz crystal 15 of the reference signal oscillator circuit 16 is set, for example, to generate a frequency of 1.16 MHz corresponding to 1/10 of the frequency 11.6 MHz of the recovered clock signal $CK_1$ when recording has been effected in the first record modulation mode. The control circuit 17, in the course of the reproducing operation, tries to detect existence of any beat component in the compared output $S_{CP1}$ obtained from the frequency comparison circuit 14, and upon detecting no beat component included therein, determines that the digital data has been recorded on the magnetic tape 3 by in the first record modulation mode. Hence, circuit 17 provides a control signal $S_{CNT1}$ to the first and the second switching circuits 11, 12 for conditioning them as shown on FIG. 3 and thereby selecting the first equalizer circuit 5A and the first demodulating process circuit 9A, respectively.

Figure 3:
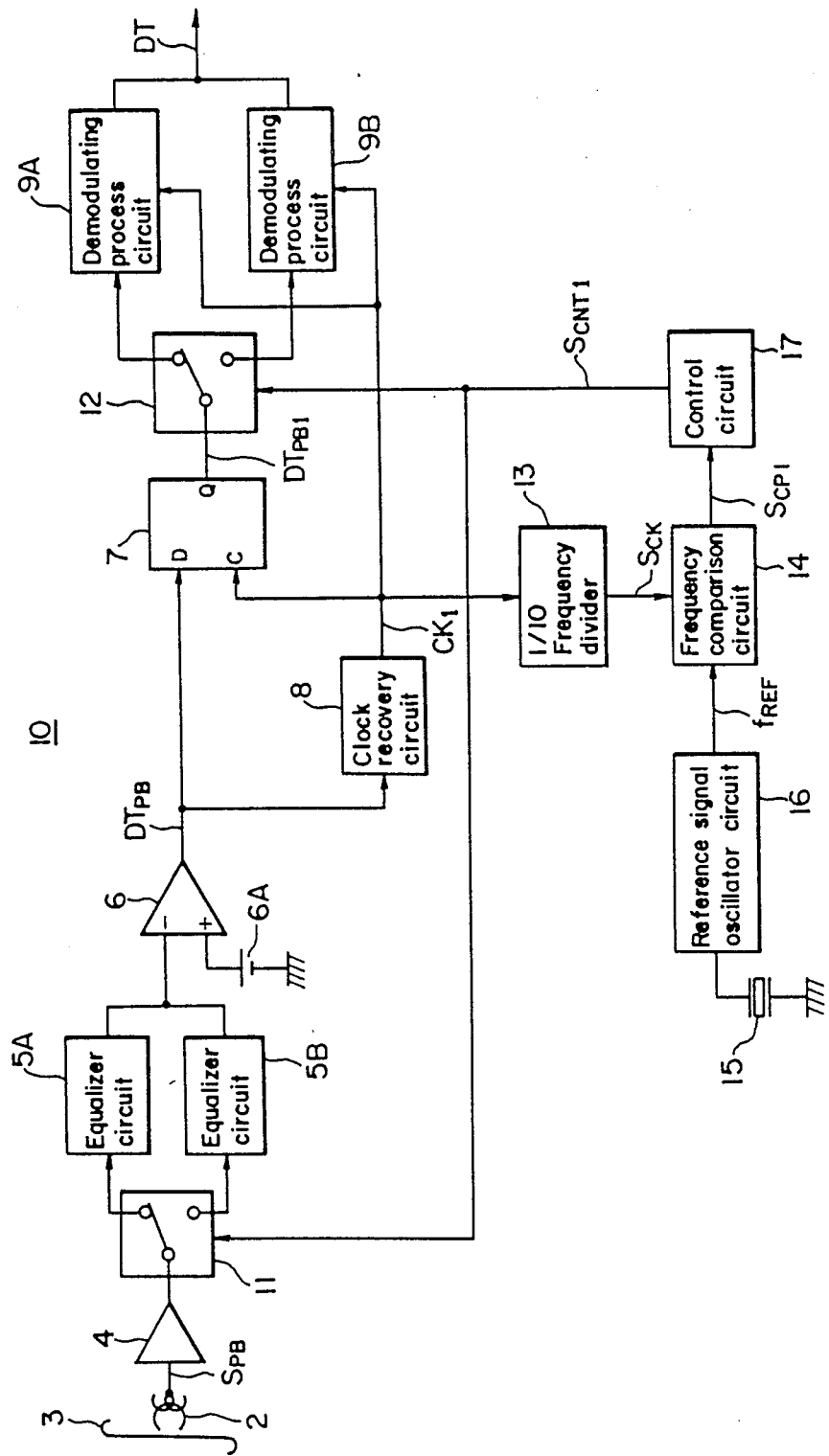
FIG. 3 is a block diagram showing a first embodiment of the present invention.

On the other hand, upon detecting a beat component included in the compared output $S_{CP1}$, the control circuit 17 determines that the digital data has been recorded on the magnetic tape 3 in the second record modulation mode, so that it provides a control signal $S_{CNT1}$ by which the first and the second switching circuits 11, 12 are changed-over from the conditions shown on FIG. 3 for selecting the second equalizer circuit 5B and the second demodulating process circuit 9B, respectively.

The 1/10 frequency divider 13, frequency comparison circuit 14, quartz crystal 15, reference frequency oscillator circuit 16 and control circuit 17 form a detecting means which identifies the frequency of the recovered clock signal $CK_1$ and thereby determines which of the first and the second record modulation modes has been used in recording.

With the above described arrangement, it is possible to provide a digital data reproducing apparatus capable of easily detecting whether the first record modulation mode or the second record modulation mode has been used on the basis of the presence or absence of a beat component in the signal $S_{CP1}$ resulting from the comparison of the frequency of the recovered clock signal and the frequency of the reference frequency signal having a clock frequency in corresponding to the frequency used for the first or the second record modulation mode.

Figure 4:
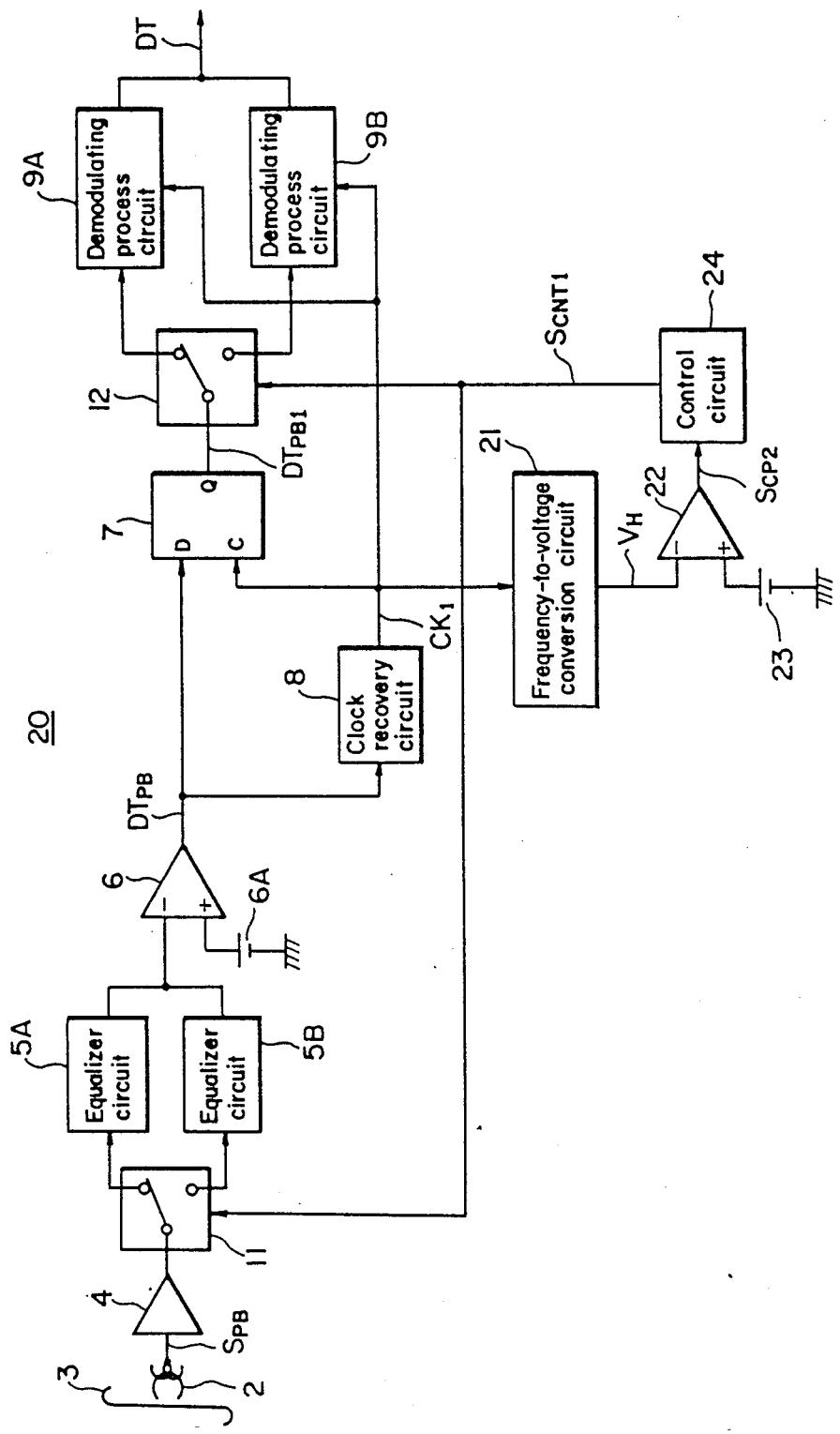
FIG. 4 is a block diagram showing a second embodiment of the present invention.

Referring now to FIG. 4, wherein parts corresponding to those shown in FIG. 3 are identified by the same reference numerals, it will be seen that, in a digital data reproducing apparatus 20 according to a second embodiment of the present invention, a recovered clock signal $CK_1$ obtained from a clock recovery circuit 8 is supplied to a synchronizing circuit 7 and first and second demodulating process circuits 9A, 9B, as well as to a frequency-to-voltage conversion circuit 21.

Figure 5:
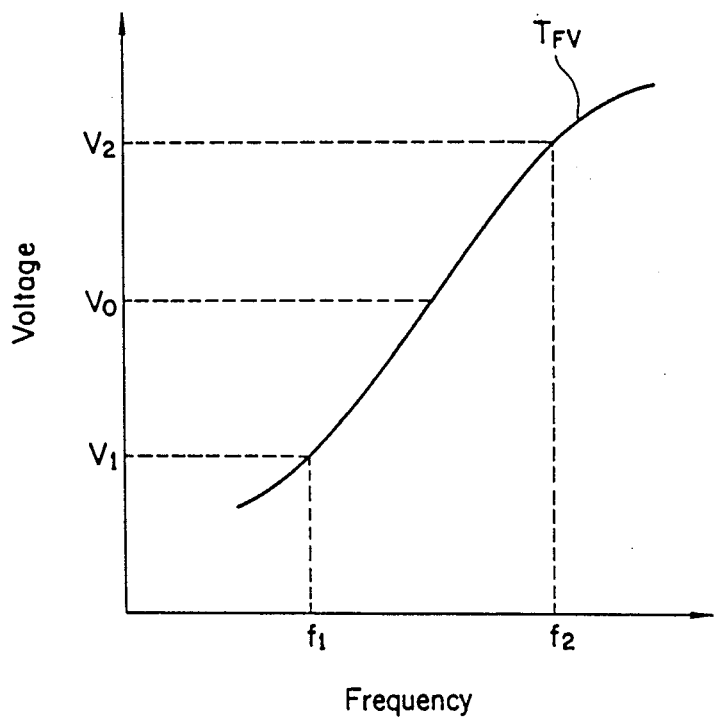
FIG. 5 is a characteristic diagram showing a characteristic of a frequency-to-voltage conversion circuit in the embodiment of FIG. 4.

The frequency-to-voltage conversion circuit 21 is provided with a frequency-voltage conversion characteristic $T_{FV}$ as shown in FIG. 5, and converts the incoming recovered clock signal $CK_1$ to a voltage $V_H$ corresponding to its frequency and delivers the voltage $V_H$ to the inverting input terminal of a comparison circuit 22 which may be constituted by an operational amplifier.

The noninverting input terminal of the comparison circuit 22 is grounded through a voltage source 23 providing a predetermined reference voltage $V_{REF1}$. In the present embodiment, the reference voltage $V_{REF1}$ is set to a voltage $V_0$ located, on the conversion characteristic $T_{FV}$, approximately midway between the voltage $V_1$ corresponding to the frequency $f_1$ ($=11.6$ MHz) of the recovered clock signal $CK_1$ in the case of the first record modulation mode and the voltage $V_2$ corresponding to the frequency $f_2$ ($=14.8$ MHz) of the recovered clock signal $CK_1$ in the case of the second record modulation mode.

The comparison circuit 22 supplies a compared output $S_{CP2}$ to a control circuit 24. The compared output $S_{CP2}$ has a logical level "H" when the incoming voltage $V_H$ to be compared is lower than the reference voltage $V_{REF1}$ (i.e., when the voltage $V_H$ is the voltage $V_1$ corresponding to the frequency $f_1$ of the recovered clock signal $CK_1$ in the case of the first record modulation mode). Conversely, the compared output $S_{CP2}$ has a logical level "L" when the incoming voltage $V_H$ to be compared is higher than the reference voltage $V_{REF1}$ (i.e., when the voltage for $V_H$ is the voltage $V_2$ corresponding to the frequency $f_2$ of the recovered clock signal $CK_1$ in the case of the second record modulation mode).

The control circuit 24, operating in response to the logical level of the compared output $S_{CP2}$ obtained from the comparison circuit 22, determines, when the compared output $S_{CP2}$ has a logical level "H", that the digital data has been recorded on the magnetic tape 3 in the first record modulation mode, and outputs a control signal $S_{CNT1}$ to the first and the second switching circuits 11, 12 for which causes the latter to select the first equalizer circuit 5A and the first demodulating process circuit 9A, respectively.

On the other hand, when the compared output $S_{CP2}$ has a logical level "L", the control circuit 24 determines that the digital data has been recorded on the magnetic tape 3 in the second record modulation mode, and outputs a control signal $S_{CNT1}$ to the first and the second switching circuits 11, 12 which causes the latter to select the second equalizer circuit 5B and the second demodulating process circuit 9B, respectively.

In the embodiment of FIG. 4, the frequency-to-voltage conversion circuit 21, comparison circuit 22, voltage source 23, and control circuit 24 form the detecting means which identifies the frequency of the recovered clock signal $CK_1$ and thereby determines which of the first and the second record modulation modes has been used.

With the arrangement, with reference to FIGS. 4 and 5 it is possible to provide a digital data reproducing apparatus capable of easily detecting whether the first or the second record demodulation mode has been used on the basis of the logical level of the output $S_{CP2}$ provided as a result of the comparison of the voltage obtained from the recovered clock signal by the frequency-to-voltage conversion in the circuit 21 with the predetermined reference voltage from the source 23.

Further, with the described arrangement, since the recovered clock signal $CK_1$ is converted into a voltage $V_H$, the SN (signal to noise) ratio can be much improved. Thus, the embodiment of FIGS. 4 and 5 has an advantage over the arrangement of FIG. 3 in regard to its detection accuracy.

In the first embodiment described above, with reference to FIG. 3, the frequency of the recovered clock signal is divided by 10 and this divided frequency is compared with a reference frequency signal whose frequency is 1/10th time the frequency of the recovered clock signal in the first or the second record modulation mode. However, the frequency dividing ratio is not limited to that particular value. In other words, by dividing the recovered clock signal by n and comparing the divided signal with a reference frequency signal whose frequency is 1/n times the frequenccy of the recovered clock signal for the first or second record modulation mode results can be obtained.

In the above described embodiments, specific mention has been made of the BI-phase Mark demodulation method and the 8-10 demodulation method as the two record modulation modes, but the present invention is not limited thereto. In other words, the invention can be similarly favorably applied tothe reproduction of digital data from a magnetic tape in any case where the digital data are selectively recorded in a plurality of record modulation modes characterized by different recording densities.

Further, in the above described embodiments, specific mention has been made to the application of the present invention to the audio signal system of an 8-mm VTR, but the present invention is not so limited. For example, the invention can be widely applied to digital data reproducing apparatus for reproducing digital data in the video signal system of VTRs for digital recording and in R-DAT. Further, the magnetic recording media to which the present invention is applicable are not limited to magnetic tapes but the same can be favorably applied to digital data reproducing apparatus using other magnetic recording media, such as, magnetic disk devices.

It will be appreciated that, since in accordance with the present invention the record modulation mode used for recording data on a magnetic recording medium is detected on the basis of the frequency of the recovered clock signal, a digital data reproducing apparatus capable of easily detecting whether the first or the second record modulation mode has been used can be simply realized. Therefore, the equalizing characteristics and the demodulation systems can be switched over as required based on the result of the aforesaid detection, with the result that a digital data reproducing apparatus capable of handling magnetic recording media with data recorded in two different record modulation modes can be easily provided.

What is claimed is:

1. Digital data reproducing apparatus, comprising:
   a magnetic head and a reproducing amplifier connected in series for deriving from a magnetic recording medium a reproduced digital signal which was recorded with one of a plurality of record modulation modes;
   a clock recovery circuit to which said reproduced digital signal is applied for generating a recovered clock signal;
   demodulating means having a plurality of operating modes respectively corresponding to said record modulation modes and being supplied with said digital signal and said recovered clock signal for deriving demodulated digital data from said reproduced digital signal;
   detecting means for generating a mode control signal representing the record modulation mode of said reproduced digital signal and being based on a frequency of said recovered clock signal, said detecting means including reference signal generating means and frequency comparison means which compares the frequency of said recovered clock signal with the frequency of said reference signal generating by said reference signal generating means; and
   control means for controlling said operating modes of said demodulating means in response to said mode control signal.

2. Digital data reproducing apparatus, comprising:
   a magnetic head and a reproducing amplifier connected in series for deriving from a magnetic recording medium a reproduced digital signal which was recorded with one of a plurality of record modulation modes;
   a clock recovery circuit to which said reproduced digital signal is applied for generating a recovered clock signal;
   demodulating means having a plurality of operating modes respectively corresponding to said record modulation modes and being supplied with said digital signal and said recovered clock signal for deriving demodulated digital data from said reproduced digital signal;
   detecting means for generating a mode control signal representing the record modulation mode of said reproduced digital signal and being based on a frequency of said recovered clock signal, said detecting means including a reference voltage source, a frequency-to-voltage conversion means supplied with said recovered clock signal, and voltage comparison means which compares the output voltage representing the frequency of said recovered clock signal with said reference voltage; and
   control means for controlling said operating modes of said demodulating means in response to said mode control signal.

3. Digital data reproducing apparatus comprising:
   a magnetic head and a reproducing amplifier connected in series for deriving from a magnetic recording medium a reproduced digital signal which was recorded with one of a plurality of record modulation modes;
   a clock recovery circuit to which said reproduced digital signal is applied for generating a recovered clock signal;
   demodulating means having a plurality of operating modes respectively corresponding to said record modulation modes and being supplied with said digital signal and said recovered clock signal for deriving demodulated digital data from said reproduced digital signal;
   detecting means for generating a mode control signal representing the record modulation mode of said reproduced digital signal and being based on a frequency of said recovered clock signal;
   control means for controlling said operating modes of said demodulating means in response to said mode control signal; and
   equalizing means connected between said reproducing amplifier and said demodulating means, said mode control signal being also supplied to said equalizing means in order to adjust equalizing characteristics for said reproduced digital signal based on said mode control signal.

* * * * *